March 31, 1970   H. A. HICKEY   3,503,616
ECCENTRIC BUSHING FOR GLAND CASE KEYS
Filed Dec. 26, 1967   3 Sheets-Sheet 1

WITNESSES:
Helen M. Farkas
James F. Young

INVENTOR
Herbert A. Hickey
BY F. V. Lyle
ATTORNEY

March 31, 1970 H. A. HICKEY 3,503,616
ECCENTRIC BUSHING FOR GLAND CASE KEYS
Filed Dec. 26, 1967 3 Sheets-Sheet 2

United States Patent Office 3,503,616
Patented Mar. 31, 1970

3,503,616
ECCENTRIC BUSHING FOR GLAND CASE KEYS
Herbert A. Hickey, Philadelphia, Pa., assignor to Westinghouse Electric Corporation, Pittsburgh, Pa., a corporation of Pennsylvania
Filed Dec. 26, 1967, Ser. No. 693,470
Int. Cl. F16j 15/44
U.S. Cl. 277—4    6 Claims

ABSTRACT OF THE DISCLOSURE

In the construction of a steam turbine having shaft seal rings mounted in a gland case attached to the end of the turbine casing, a plurality of gland case key assemblies are used to permit radial expansion and maintain proper clearance between the turbine rotor shaft and the seal rings. An eccentric bushing is provided in each key assembly to make it unnecessary to hand fit the key in the gland case during assembly.

BACKGROUND OF THE INVENTION

This invention relates generally, to elastic fluid-utilizing machines and, more particularly to steam turbines having shaft seal rings.

When shaft seal rings are mounted in a gland case attached to the end of a turbine casing, a plurality of equally spaced gland case keys are used to permit radial expansion and maintain proper clearance between the turbine rotor shaft and the seal rings. Heretofore, accumulated tolerances in manufacturing and shop assembly have required the keys to be hand fitted at assembly and sometimes new keys must be fitted again during assembly in the field.

An object of this invention is to facilitate the assembling of a gland case containing shaft seal rings on a turbine casing in a manner to permit radial expansion and maintain proper clearance between the turbine shaft and the seal rings.

Another object of the invention is to make it unnecessary to hand fit the gland case keys during assembly of the gland case.

Other objects of the invention will be explained fully hereinafter or will be apparent to those skilled in the art.

SUMMARY OF THE INVENTION

In accordance with one embodiment of the invention, an eccentric bushing is provided for each of the gland case key assemblies in a turbine. The bushing can be rotated to compensate for any inaccuracy in the location of the keyway in the gland case relative to the dowel stud in the turbine casing to which the key is attached, thereby making it unnecessary to hand fit the key in the keyway during assembly. Thus, both the keyway and the key can be made to drawing dimensions by usual manufacturing methods.

BRIEF DESCRIPTION OF THE DRAWINGS

For a better understanding of the nature and objects of the invention, reference may be had to the following detailed description, taken in conjunction with the accompanying drawings, in which.

DESCRIPTION OF THE PREFERRED EMBODIMENT

Figure 1:
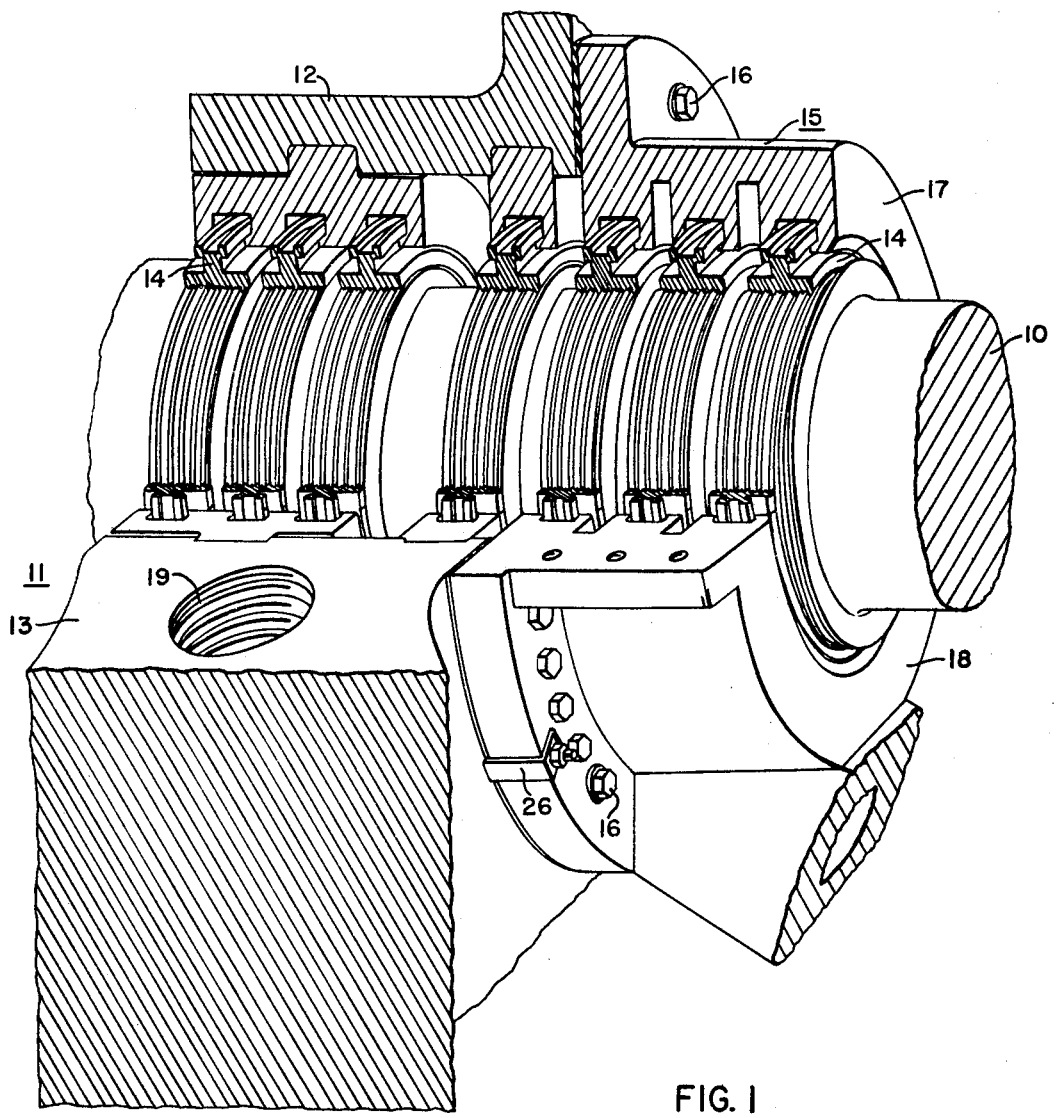
FIGURE 1 is an isometric view of a portion of a turbine structure embodying principal features of the invention, a section being cut away for clearness.

Referring to the drawings, particularly to FIGURE 1, the portion of a turbine structure shown therein comprises a shaft 10 rotatably mounted in a main housing 11 which is divided along a horizontal plane P—P (FIG. 2) into an upper portion 12 and a lower portion 13. The shaft 10 is supported in suitable bearings (not shown).

Figure 3:
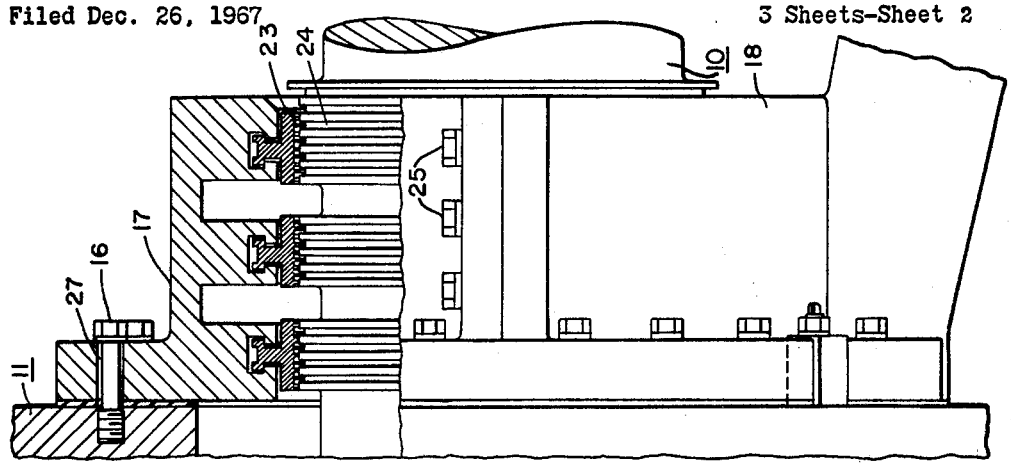
FIG. 3 is a view, partly in side elevation and partly in section, taken along the line III—III in FIG. 2.

In order to reduce steam leakage around the shaft 10, arcuately segmented seal rings 14 of the labyrinth type are mounted around the shaft 10 in the main casing 11 and also in a gland case 15 which is removably attached to the end of the main casing 11 by bolts 16. The gland case 15 is also divided along a horizontal plane into an upper portion 17 and a lower portion 18. As shown more clearly in FIG. 2, each segmented gland ring 14 is divided along a horizontal plane into an upper portion 21 and a lower portion 22. As shown in FIG. 3, each gland ring has a plurality of ridges 23 thereon which extend into grooves 24 on the shaft 10, thereby providing a shaft seal of the labyrinth type. The two halves of the gland case 15 are bolted together by bolts 25. Likewise, the two halves of the main casing 11 may be bolted together by bolts threaded into holes 19 (FIG. 1).

Figure 2:
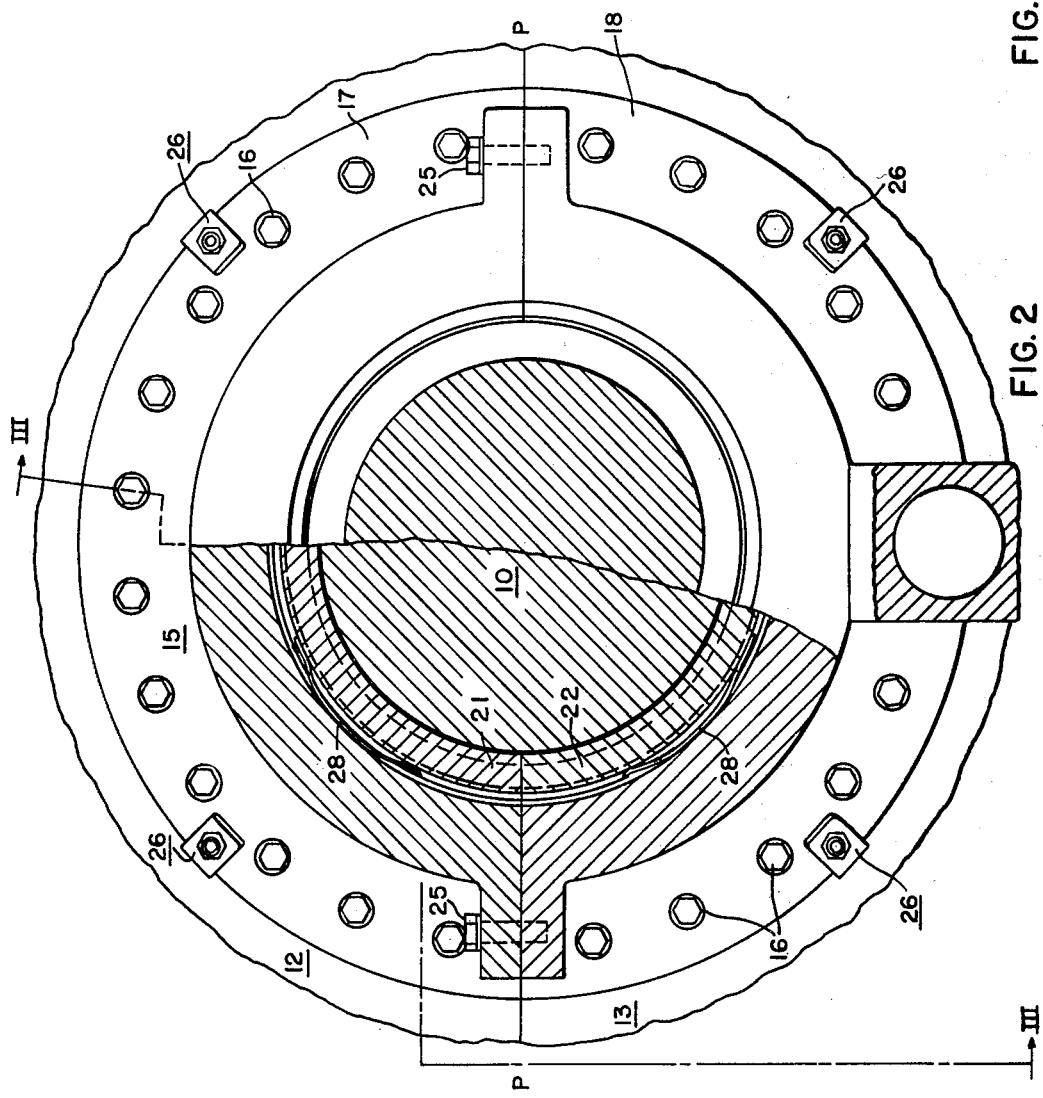
FIG. 2 is a transverse view, partly in end elevation and partly in section, of the structure shown in FIG. 1.

In order to permit radial expansion of the gland case 15 and maintain proper clearance between the turbine shaft 10 and the seal rings 14, a plurality of, for example four, key assemblies 26 are equally spaced around the gland case. The key assemblies 26 are constructed to permit radial expansion of the gland case, but prevent transverse movement of the gland case relative to the shaft 10. As shown in FIG. 3, clearance is provided between the bolts 16 and holes 27 in the gland case 15 through which the bolts 16 extend to attach the case to the main casing 11. In this manner, provision is made for expansion of the gland case relative to the main casing. As shown in FIG. 2, a leaf spring 28 is provided between each segment of the seal ring 14 and the gland case 15. The springs 28 hold the segmented seal ring 14 in position when there is no pressure in the gland case 15 and allow the segments of the seal ring 14 to move radially outwardly when a rub with the shelf occurs due to misalignment during operation pressure in the gland case during operation helps to hold the segments of the seal rings in place.

Figure 4:
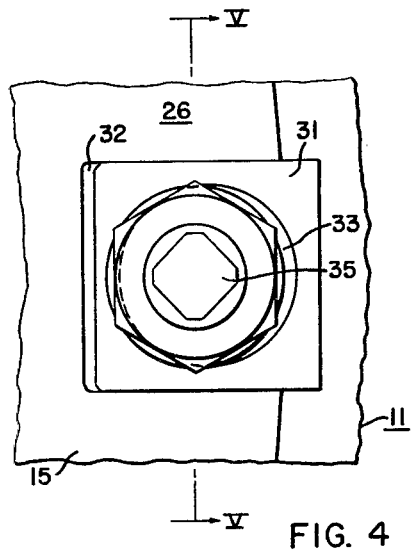
FIG. 4 is an enlarged detail view of one of the gland case key assemblies.
Figure 6:
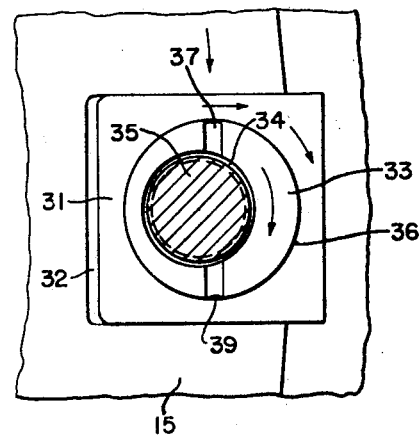
FIG. 6 is a view, partly in elevation and partly in section, taken along the line VI—VI in FIG. 5.
Figure 5:
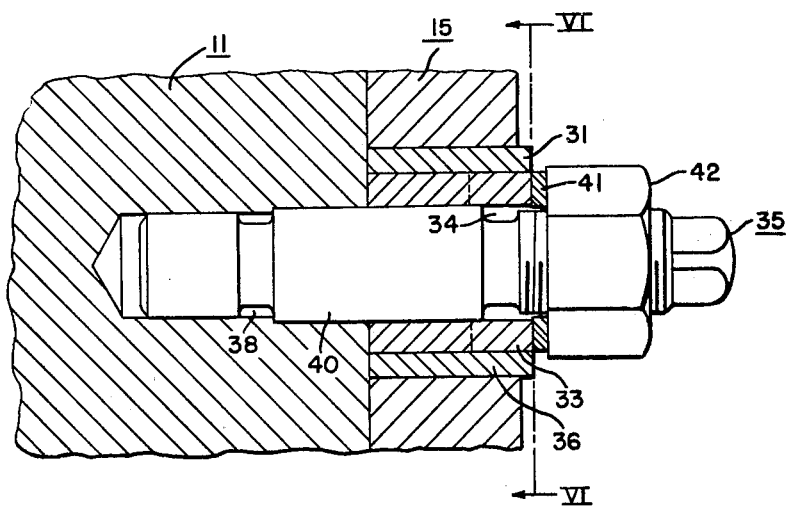
FIG. 5 is a view, in section, taken along the line V—V in FIG. 4.

As shown more clearly in FIGS. 4 and 6, each key assembly 26 includes a rectangular key 31 slidably disposed in a keyway 32 in the gland case 15. As explained hereinbefore, inaccuracy resulting from accumulated tolerances in manufacturing and shop assembly heretofore have made it necessary to hand fit each key 31 in its keyway 32 when the gland case 15 is assembled on the main turbine casing 11. In order to compensate for the manufacturing inaccuracy and to eliminate the hand fitting operation, an eccentric bushing 33 is provided for each key 31. The bushing 33 is of cylindrical shape and has a circular hole 34 eccentrically extending through the bushing for receiving a dowel stud 35 by means of which the key assembly is attached to the main casing 11. The bushing 33 is rotatably disposed in a circular hole 36 extending through the key 31. A groove 37 is provided in the outer end of the bushing 33 to permit it to be rotated by means of a spanner wrench or other suitable tool.

By reviewing the history of key fittings, an optimum bushing offset is determined for all gland case keys. The hole 36 in the key 31 is just large enough to receive the bushing 33. The hole 34 in the bushing is just large enough to receive a portion 40 of the dowel stud 35 having the greatest diameter. The keyway 32 is of sufficient depth to more than accommodate the key, radial expansion, and the bushing eccentricity. The keyway and key can now be made to drawing dimensions. Dowel holes 38 for receiving the dowel studs 35 are machined in the casing 11 with the gland case bolt holes 27. In this manner, all hand fitting operations are eliminated.

To assemble the key after the gland case 15 has been aligned and attached to the casing 11 by means of the bolts 16, the dowel stud 35 is driven into the dowel hole 38. The key 31 is placed in the keyway 32 over the dowel stud 35. The eccentric bushing 33 is then placed into the dowel stud 35 with the stud extending through the hole 34 in the bushing. The bushing is rotated until it is aligned with the hole 36 in the key. The key must also be moved in or out in the keyway to help align the bushing and the key. A slight chamfer may be provided on the end of the bushing ot facilitate alignment. When the bushing is fully inserted into the hole, it is locked in place by peening or tack welding it as shown at 39 in FIG. 6. The key assembly is retained in position by a washer 41 and a nut 42 which is threaded onto the dowel stud 35.

From the foregoing description it is apparent that the invention provides an assembly which permits radial expansion of a gland case in order to maintain proper clearance between a turbine shaft and shaft seal rings. The novel key assemblies which permit radial expansion are installed without it being necessary to hand fit each key in its cooperating keyway because of manufacturing inaccuracies. In this manner, the manufacturing time and the cost of the product are reduced.

Since numerous changes may be made in the above described construction and different embodiments of the invention may be made without departing from the spirit and scope thereof, it is intended that all subject matter contained in the foregoing description or shown in the accompanying drawings shall be interpreted as illustrative and not in a limiting sense.

I claim:

1. In an elastic fluid-utilizing machine, in combination, a main casing having a shaft rotatably mounted therein,
a gland case surrounding a portion of the shaft extending beyond the casing,
a labyrinth seal ring mounted in the gland case around the shaft,
a threaded means for removably attaching the gland case to the main casing,
a plurality of keyways in the gland case,
a key assembly in each keyway to permit radial expansion of the gland case and maintain proper clearance between the shaft and the seal ring,
means for attaching the key assembly to the main casing, and
each key assembly including a key and an eccentric bushing to compensate for any inaccuracy in the location of the keyway relative to the key assembly attaching means.

2. The combination defined in claim 1 wherein the keyways are angularly spaced around the gland case.

3. The combination defined in claim 1 wherein clearance is provided between the threaded means and the gland case.

4. The combination defined in claim 1 wherein the eccentric bushing is rotatably disposed in said key.

5. The combination defined in claim 1 wherein the bushing is of cylindrical shape and has a hole eccentrically extending therethrough for receiving the key assembly attaching means.

6. The combination defined in claim 5 wherein the attaching means comprises a dowel stud secured in the main casing.

References Cited

UNITED STATES PATENTS

| | | | |
|---|---|---|---|
| 980,542 | 1/1911 | Lovell | 277—66 |
| 1,767,019 | 6/1930 | Sergeeff | 85—1 X |
| 2,229,963 | 1/1941 | Dickinson | 277—66 |
| 2,723,867 | 11/1955 | Howard et al. | 277—4 |

SAMUEL ROTHBERG, Primary Examiner

U.S. Cl. X.R.

85—1; 277—53